(12) United States Patent
Hanson et al.

(10) Patent No.: US 11,061,051 B2
(45) Date of Patent: Jul. 13, 2021

(54) SENSOR BLENDING WITH OFFSET ADJUSTMENT

(71) Applicant: Honeywell International Inc., Morris Plains, NJ (US)

(72) Inventors: Timothy J Hanson, Plymouth, MN (US); Jens M Henrickson, Saint Paul, MN (US); Keith F Winegar, Lino Lakes, MN (US)

(73) Assignee: Honeywell International Inc., Charlotte, NC (US)

(*) Notice: Subject to any disclaimer, the term of this patent is extended or adjusted under 35 U.S.C. 154(b) by 325 days.

(21) Appl. No.: 16/146,496

(22) Filed: Sep. 28, 2018

(65) Prior Publication Data

US 2020/0103436 A1 Apr. 2, 2020

(51) Int. Cl.
*G01P 21/00* (2006.01)
*G01P 15/08* (2006.01)
*G01C 21/18* (2006.01)

(52) U.S. Cl.
CPC .............. *G01P 21/00* (2013.01); *G01C 21/18* (2013.01); *G01P 15/0802* (2013.01); *G01P 2015/0868* (2013.01)

(58) Field of Classification Search
CPC ................................ G01P 21/00; G01C 21/18
See application file for complete search history.

(56) References Cited

U.S. PATENT DOCUMENTS

| 8,762,091 B1* | 6/2014 | Foxlin ................. G01C 25/00 702/87 |
| 2013/0174636 A1* | 7/2013 | Joseph ................. G01C 25/005 73/1.41 |
| 2017/0220855 A1 | 8/2017 | Bose et al. |
| 2018/0096199 A1 | 4/2018 | Bose et al. |
| 2019/0107616 A1* | 4/2019 | Tsai ..................... G01S 13/723 |

OTHER PUBLICATIONS

Intellectual Property Office, "Search Report from GB Application No. 1913688.6", from Foreign Counterpart to U.S. Appl. No. 16/146,496, dated Mar. 13, 2020, pp. 1-3, Published: GB.

* cited by examiner

*Primary Examiner* — Jamel E Williams
(74) *Attorney, Agent, or Firm* — Fogg & Powers LLC (57) ABSTRACT

A method for generating a sensor output from the outputs of first and second sensors is provided. The method comprising receiving the outputs from the first and second sensors; estimating an offset between the outputs of the first and second sensors over a first range of outputs; adjusting the output of the second sensor based on the estimated offset; and generating a sensor output, based on the output of the first sensor, the adjusted output of the second sensor and a blending function that blends the output of the first sensor and the adjusted output of the second sensor.

15 Claims, 11 Drawing Sheets

SENSOR BLENDING WITH OFFSET ADJUSTMENT

BACKGROUND

Inertial Measurement Units (IMUs) are used in a variety of applications to measure and report a body's specific force and angular rate using a combination of sensors, e.g., accelerometers and gyroscopes. IMUs are used, for example, to aid in navigation of aircraft, including unmanned aerial vehicles (UAVs), spacecraft, rockets, bullets and missiles. Modern IMUs use sensors that are formed as microelectromechanical system (MEMS).

Many applications demand that IMUs perform over a wide range of rates and accelerations. In addition this high level of performance is expected at low cost. Currently available low-cost sensors are often limited in operational range, or in performance, but seldom have both characteristics (high performance over a wide operation range).

Therefore, there is a need in the art for a low-cost IMU with high performance over a wide range of rates and accelerations. This same need applies in other contexts that can benefit from improved performance of low cost sensors such as accelerometers, gyroscopes, magnetometers, temperature sensors and the like.

SUMMARY

One embodiment of the present invention includes a method for generating a sensor output from the outputs of first and second sensors. The method comprising receiving the outputs from the first and second sensors; estimating an offset between the outputs of the first and second sensors over a first range of outputs; adjusting the output of the second sensor based on the estimated offset; and generating a sensor output, based on the output of the first sensor, the adjusted output of the second sensor and a blending function that blends the output of the first sensor and the adjusted output of the second sensor.

BRIEF DESCRIPTION OF THE DRAWINGS

Embodiments of the present invention can be more easily understood and further advantages and uses thereof more readily apparent, when considered in view of the detailed description and the following figures in which.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention operate two or more sensors simultaneously and combine the outputs of the two or more sensors into a single sensor output. Each of the two or more sensors has an operational range. Further, the operational ranges of the two or more sensors only partially overlap. Operating the two or more sensors simultaneously and blending their outputs produces a sensor output with an extended operational range compared to the individual sensors.

Advantageously, embodiments of the present invention use two or more inexpensive sensors. In a non-limiting example, the low cost sensors, in one embodiment, are implemented as microelectromechanical systems (MEMS) sensors although other appropriate low-cost sensors can also be used. Such low-cost sensors may comprise commercial off-the-shelf (COTS) sensors. By way of example, and not by way of limitation, such sensors may comprise MEMS accelerometers, gyroscopes, magnetometers, temperature sensors or other appropriate sensors. The outputs of the two or more sensors are combined via a software algorithm to form an output having a large operational range. In one non-limiting embodiment, the large operational range supports high dynamic sensing as seen in rockets, bullets and missiles, but also provides, for example, excellent performance in the low acceleration range region which occurs during other portions of the motion of a vehicle or object.

The embodiments described below primarily focus on sensors used in an inertial measurement system. However, it is understood that the teachings of the present invention apply to other types of sensors and sensor systems including, but not limited to, accelerometer, gyroscope, magnetometer, temperature sensors and the like. Advantageously, the teachings of the present invention enable high performance over a wider operating range for low cost sensors compared to conventional use of the low cost sensors.

In another aspect, embodiments of the present invention dynamically estimate a bias or offset between the two or more sensors, and compensate for it, so that the blending of the two outputs is seamless. Additionally, by estimating and compensating for the bias or offset between the two or more sensors in real-time, embodiments of the present invention can be manufactured while only calibrating one of the two or more sensors in the factory. This saves significant time and cost in the manufacturing process. This bias-estimation feature uses a low-pass filter, and assumes one sensor, for example, a high-g accelerometer, has a bias relative to the other sensor, for example, a low-g accelerometer, and compensates for the bias. Advantageously, embodiments of the present invention provide excellent low-range accelerometer performance, combined with wide operational range—something difficult to obtain at low cost, in a very small package, and with robust environmental survivability. In addition, the low/high transition is seamless due to the bias estimation/compensation between the low and high sensors. It is noted that transitions in the opposite direction (high to low) would likewise be seamless as well. As such, embodiments of the present invention provide an improvement in sensor technology. Embodiments of Inertial Measurement Units (IMUs) incorporating this sensor design can be incorporated in, for example, smart bullets, missiles, Unmanned Aerial Vehicles (UAVs), and munitions.

Some of the embodiments described below are directed to IMUs and sensors used in the IMUs. IMUs generally operate as a system with three orthogonal axes. For simplicity, this specification describes the operation of the sensors in a single axis, but it is understood that the functions described with respect to the sensors may be applied to the several axes of the system. Additionally, the teachings may be applied to several of the sensors of the system, or even all of the sensors of the system. In other words, the algorithms described below that are applied to a single channel or axis of a system may, in an implementation of a system, apply separate instances of the algorithm to the various channels or axes.

Figure 1:
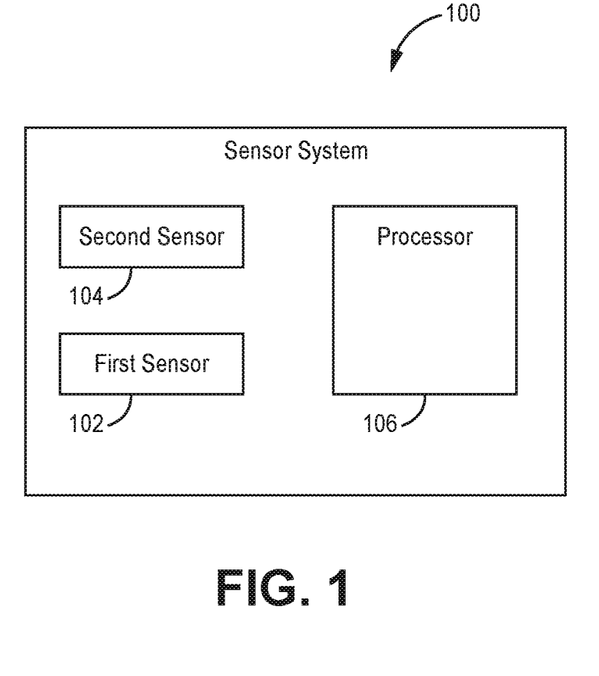
FIG. 1 is a block diagram of one embodiment of a sensor system that blends the outputs of two sensors while compensating for a sensor bias between the two sensors.

FIG. 1 is a block diagram of a sensor system, indicated generally at 100, that blends the outputs of two sensors (for example, first and second sensors 102 and 104) and that compensates for a sensor bias or offset between the outputs of the two sensors. In one embodiment, first sensor 102 is a low-g accelerometer that has an operational range, for example, of +/−14 g and second sensor 104 is a high-g accelerometer that has an operational range that overlaps with the operational range of the first sensor 102. Second sensor 104, in this embodiment, has an operational range that extends far beyond the operational range of the first sensor 102, for example, +/−200 g. Additionally, a portion of the operational range of the second sensor 104 overlaps with the operational range of the first sensor 102. Thus, by combining the outputs of first and second sensors 102 and 104, sensor system 100 has a wider, high performance operational range than either sensor individually. For example, first sensor 102 provides the output of system 100 at low-g acceleration and second sensor 104 provides the output of system 100 at high-g acceleration (with bias compensation). Further, the outputs of first and second sensors 102 and 104 are blended, as described in more detail below, over a range of g-forces that overlap in the operation ranges of the two sensors. By using two low-cost sensors, sensor system 100 produces an output signal with a high performance over a wide operating range that is normally associated with more expensive sensors.

Sensor system 100 also includes processor 106 that is programmed to perform two primary functions: (1) estimate and remove the bias or offset from the second sensor 104 and (2) generate the output of sensor system 100 including the blending of the outputs of the first and second sensors 102 and 104 in an overlapping region of their respective operating ranges. In one embodiment, only one of the two sensors is calibrated in the factory as a cost savings measure. Thus, the uncalibrated sensor (typically second sensor 104) will have an offset or bias relative to the calibrated sensor (first sensor 102). It is noted that even if both sensors are calibrated in the factory, a bias or offset may develop between first and second sensors 102 and 104. In order for the outputs of these two sensors to be properly blended in their overlapping regions of operation, processor 106 is programmed to estimate and remove this bias. In one embodiment, the processor 106 is programmed to implement a low pass filter, such as an alpha/beta filter, to estimate the bias in real-time as data is produced by the first and second sensors 102 and 104

Figure 2:
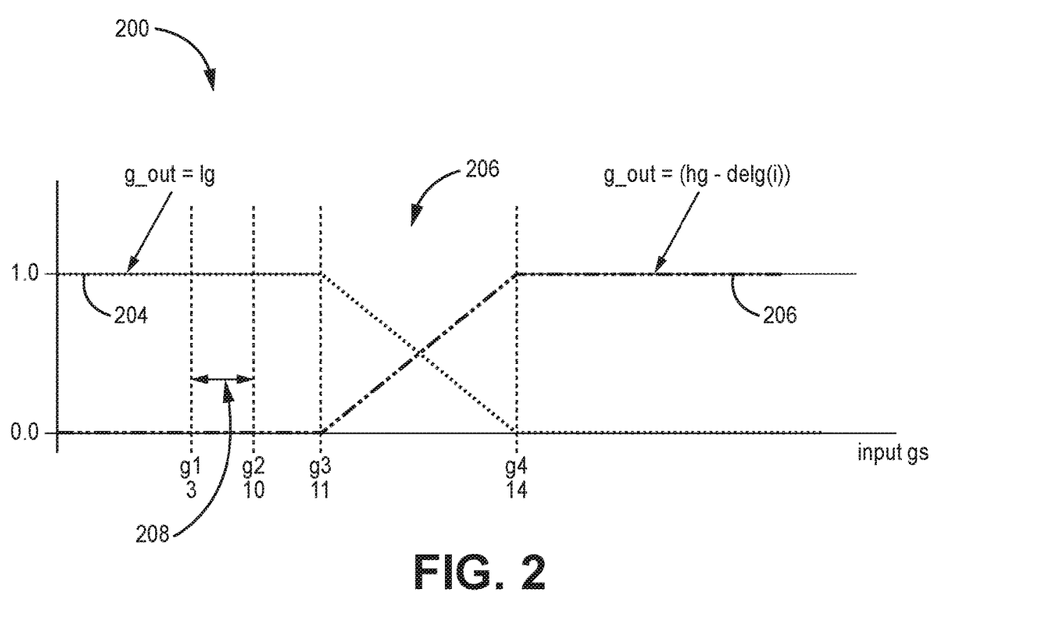
FIG. 2 is a graph that illustrates the generation of an output for the sensor system from first and second sensors taking into account sensor bias between the two sensors according to one embodiment of the present invention.

FIG. 2 is a graph that illustrates the generation of an output signal for sensor system 100 from the outputs of first and second sensors 102 and 104 of FIG. 1 taking into account sensor bias between the two sensors according to one embodiment of the present invention. In graph 200, the X-axis represents an input to the sensor measured in, for example, g forces ("gs"). The Y-axis is the percentage of the output of system 100 that is contributed by each of the two sensors, first and second sensor 102 and 104, over the range of inputs values.

For example, the Y-axis value of curve 204 represents the percentage of the contribution of the output of the first sensor 102 (for example the low-g accelerometer) to the output of system 100. As depicted in the graph, system 100 uses the output of sensor 102 exclusively from zero gs up to a first threshold (g3). In one embodiment, this first threshold is 11 g although other appropriate values can be used for this first threshold depending on factors such as, for example, the operational ranges of the first and second sensors.

Further, for input values above a second threshold, g4, the output of the sensor system 100 is set equal to the output of the second sensor 104 as adjusted for the bias or offset in the output of the second sensor 104. In one embodiment, the second threshold (g4) is set at 14 g although other values can be used for this threshold as well depending on the characteristics of the first and second sensors.

Sensor system 100 also updates an estimate of the bias or offset between the first and second sensors 102 and 104 in real-time for use in generating the output of sensor system 100. When the input to sensor system 100, as measured by the first sensor 102, falls in a range 208 between threshold values g1 and g2, system 100 updates the estimate of the bias or offset value. In one embodiment, these threshold values are 3 g and 10 g, respectively, and are well within a range in which both the first and second sensors 102 and 104 provide stable and accurate outputs.

In one embodiment, sensor system 100 implements an alpha/beta low pass filter to estimate the bias or offset between the first and second sensors 102 and 104. The alpha/beta filter calculates the bias or offset according to the following equation:

$$delg(i) = \text{alpha} * (hg(i) - lg(i)) + \text{beta} * delg(i-1)$$

wherein $delg(i)$ is the calculated value of the bias or offset, alpha and beta are selected constants, $hg(i)$ and $lg(i)$ are the outputs of the first and second sensors 102 and 104, respectively, and $delg(i-1)$ is the immediately prior value of the offset or bias.

Figure 10:
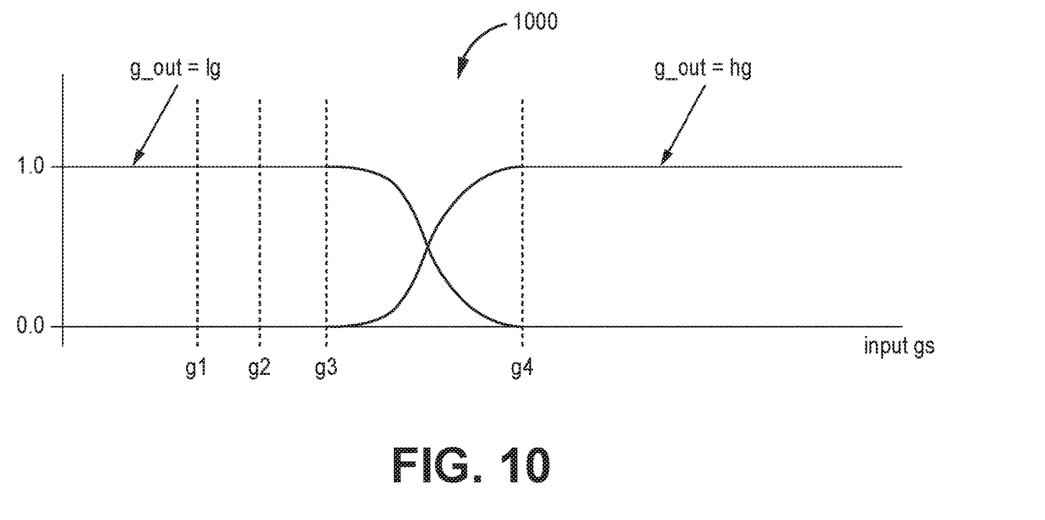
FIG. 10 is a graph that illustrates an alternate technique for blending the outputs of the two sensors in the embodiment of FIG. 1.

As illustrated in FIG. 2, the output of system 100 is a blend of the outputs of the first and second sensors 102 and 104 in a region 206 between first and second thresholds g3 and g4. In one embodiment, the outputs of first and second sensors are blended according to the following equation:

$$g\_out(i)=A(i)*lg(i)+(1.0-A(i))*(hg(i)-delg(i))$$

wherein A(i) is calculated according to the equation:

$$A(i)=(abs(lg(i))-g4)/(g3-g4)$$

wherein lg(i) is the output of the first sensor 102, hg(i) is the output of the second sensor 104, delg(i) is the current value of the bias or offset, and g3 and g4 are constants that define the selected range. In this embodiment, the blending implements a linear increase in the percentage contribution of the output of second sensor 104 as the input to the sensor system 100 increases. Similarly, the percentage contribution of the output of the first sensor linearly decreases as a function of increasing the input to sensor system 100. In other embodiments, the blending function can take on other forms, such as, the sinusoidal transition 1000 shown in FIG. 10. Other appropriate equations can be used to blend the outputs of the two sensors in this region of input signal values.

As described, the output of sensor system 100 of FIG. 1 is a blended output of the first and second sensors 102 and 104 with offset or bias compensation.

Figure 3:
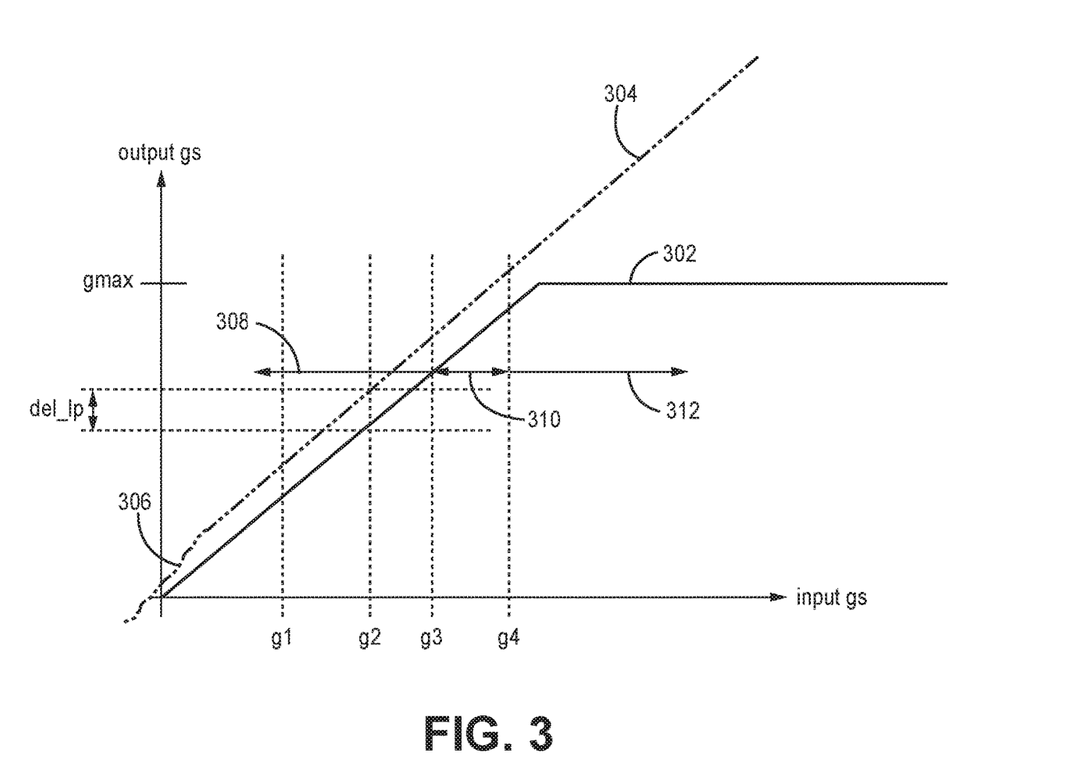
FIG. 3 is another graph that illustrates the operation of a pair of sensors with differing operating ranges and a bias or offset according to one embodiment of the present invention.

FIG. 3 is another graph that illustrates the operation of the pair of sensors with differing operating ranges in system 100 of FIG. 1 according to one embodiment of the present invention. In this graph, the X-axis again represents the input to system 100 in gs. The same four thresholds are represented as in FIG. 2. The Y-axis represents the value of the output of the first and second sensors 102 and 104, also in gs, that correspond to the input values on the X-axis. Curve 302 represents the output of first sensor 102. Curve 302 demonstrates that the output of first sensor 102 rises linearly with increasing input until it reaches a value, g max, after which the first sensor no longer provides accurate readings.

Curve 304 represents the output of second sensor 104. At region 306 (low-g inputs), second sensor 104 does not provide accurate readings of the measured stimulus. However, as the input to sensor system 100 increase, the second sensor 104 begins to produce more accurate results and similarly provides an output signal that tracks linearly with the input to sensor system 100. Because second sensor 104 has a higher operating range, the second sensor 104 provides accurate output above g max and is used by sensor system 100 to determine the output of sensor system 100 for inputs above the threshold g4.

In one embodiment, second sensor 104 of system 100 is not calibrated in the factory. Thus, as shown in FIG. 3, the two curves (302 and 304) do not provide the same output for a corresponding input. Advantageously, embodiments of the present invention calculate a bias or offset between the two curves 302 and 304 when the input to system 100 falls in the range from g1 to g2. For example, the bias (del_lp) is illustrated with respect to an input value of g2. One method for calculating this bias is described below with respect to FIG. 4. It is noted that even if second sensor 104 is calibrated in the factory, a bias or offset between first and second sensors 102 and 104 may develop after system 100 leaves the factory. The embodiments of the present invention will detect and compensate for such bias or offset between first and second sensors 102 and 104, as well.

As illustrated in FIG. 3, system 100 solely uses the output of first sensor 102 in the region 308 below threshold g3. System 100 uses a blending of the outputs of first and second sensors 102 and 104 in region 310 between thresholds g3 and g4. Finally, in region 312, above g4, sensor system 100 generates its output solely on the output of second sensor 104 (adjusted for the bias or offset).

Figure 4:
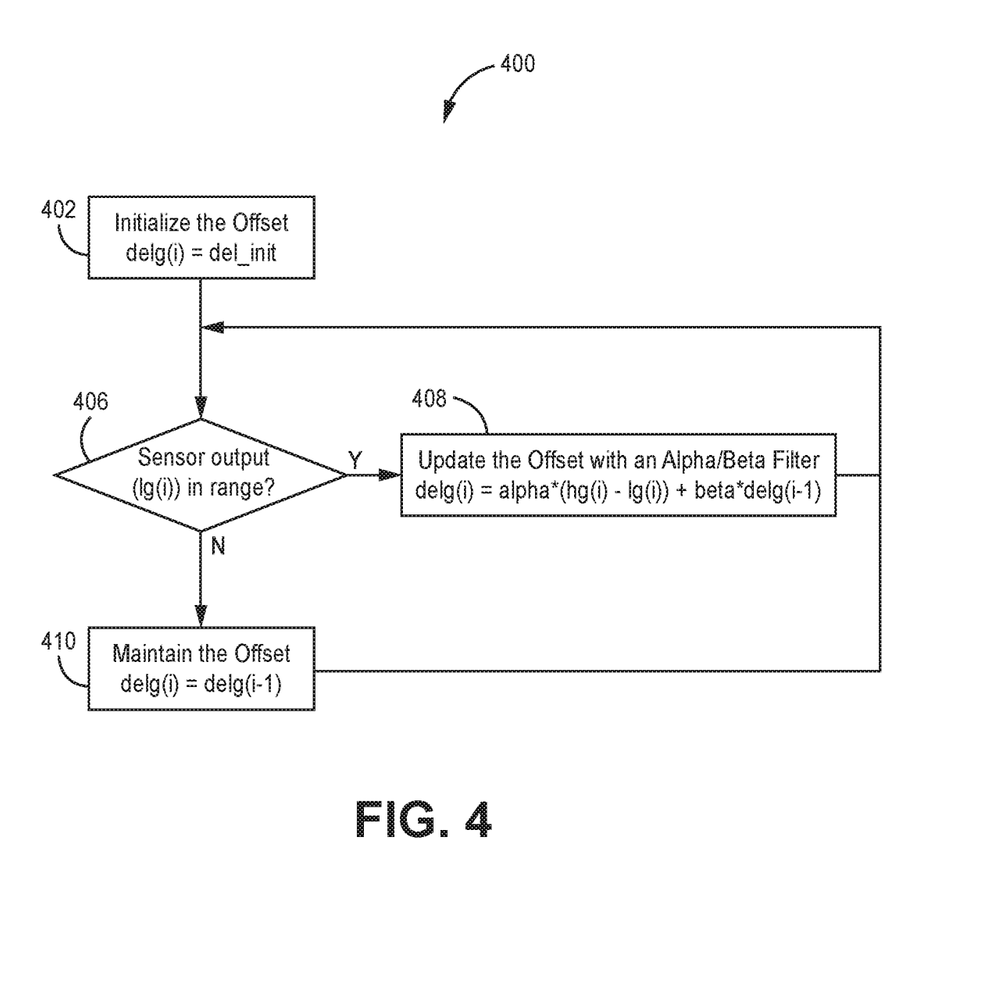
FIG. 4 is a flow chart of one embodiment of a process for a low pass filter that determines an offset or bias between the outputs of first and second sensors.

FIG. 4 is a flow chart of one embodiment of a process for a low pass filter that determines an offset or bias between the outputs of first and second sensors. In one embodiment, this process is implemented by sensor system 100 of FIG. 1. The process begins at block 402 and initializes an offset value, delg(i), for sensor system 100. For example, in one embodiment, the offset value is initially set at zero. In other embodiments, the offset value is set to an expected offset value, e.g., a value such as 5 g. At block 406, the process determines whether the output of the first sensor (sensor 102) is within the range of values in which both sensors are expected to provide accurate results (e.g., between g1 and g2 in FIGS. 2 and 3). If so, the method applies an alpha/beta filter at block 408 to update the bias estimate according to the following equation:

$$delg(i)=\text{alpha}*(hg(i)-lg(i))+\text{beta}*delg(i-1)$$

wherein delg(i) is the calculated value of the bias or offset, alpha and beta are selected constants, hg(i) and lg(i) are the outputs of the first and second sensors 102 and 104, respectively, and delg(i−1) is the immediately prior value of the offset or bias. In one embodiment, the values of alpha and beta are 0.5 and 0.5, respectively. The process returns to block 406. If however, the sensor output in not within the selected range, the process maintains the current estimate of the bias or offset at block 410 and returns to block 406.

Figure 5:
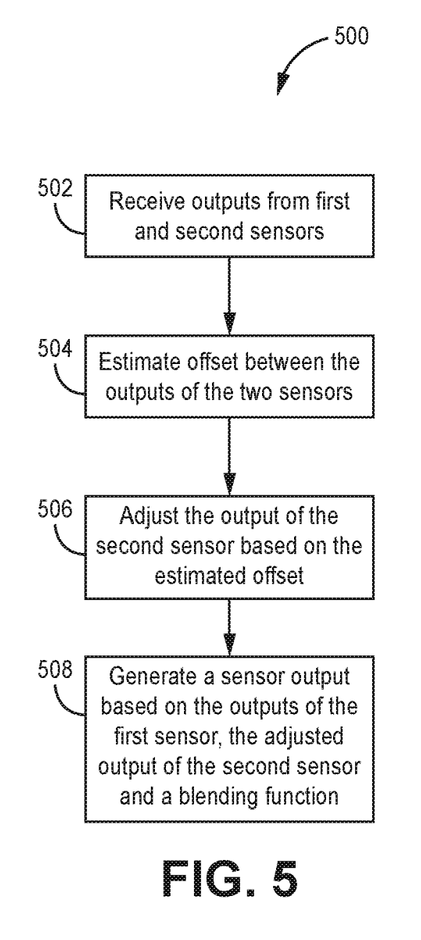
FIG. 5 is a flow chart of one embodiment of a process for generating an output based on the outputs of two sensors with differing operating ranges while accounting for a bias in the output of one of the sensors.

FIG. 5 is a flow chart of one embodiment of a process for generating an output of a sensor system based on the outputs of two sensors with differing operating ranges while accounting for a bias in the output of one of the sensors. In one embodiment, the process of FIG. 5 operates on a system such as system 100 of FIG. 1 having first and second sensors 102 and 104. However, the teachings of the process of FIG. 5 is not limited to the precise structure described above with respect to FIG. 1. The process of FIG. 5 begins at block 502. The outputs of first and second sensors are received. At block 504, an offset between the two outputs is generated, e.g., using the process of FIG. 4. At block 506, the process adjusts the output of the second sensor based on the estimated offset. At block 508, the process generates a sensor output based on the outputs of the first sensor, the adjusted output of the second sensor and a blending function.

Figure 6:
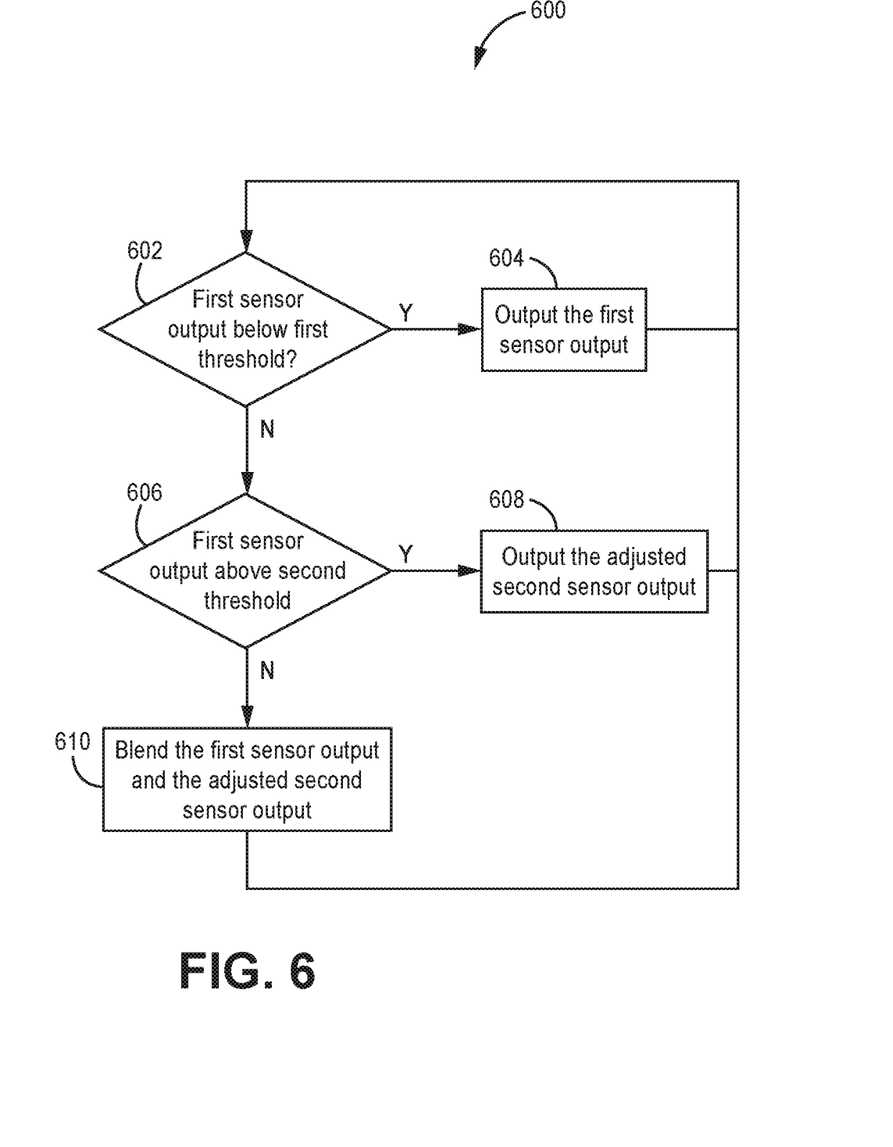
FIG. 6 is a flow chart of one embodiment of a process for applying a blending function in the process of FIG. 5.

FIG. 6 is a flow chart of one embodiment of a process for applying a blending function in the process of FIG. 5. The process begins at block 600 and determines if the first sensor output is below a threshold, e.g., below g3 in FIGS. 2 and 3. If so, the process outputs the output of the first sensor as the output of the sensor system at block 604. If, at block 602, it is determined that the first sensor output is not below the first threshold, then the process moves on to block 606. At block 606, the process determines whether the first sensor output is above a second threshold, e.g., above g4 in FIGS. 2 and 3. If so, the process outputs the second sensor output adjusted for the bias or offset calculated according to, for example, the process of FIG. 4. If, at block 606, the process determines that the first sensor output is below the second threshold, the process applies a blending function to produce an output that is a blend of the first sensor output and the adjusted second sensor output such as, for example, shown and described above with respect to FIG. 2.

The following code is an example of code that is used in one embodiment of the present invention. The first section of code (following the comment % First Section) is an example of the alpha/beta filter that is used to estimate the offset between the outputs of the first and second sensors. The second section of code (following the comment % Second Section) is an example of the blending function.

```
%First Section: Alpha/Beta filter
g1 = 4; g2 = 10 ; g3 = 11 ; g4 = 14 ; delg = zeros (size(lg)) ; alpha = 0.5
;
beta = 0.5 ; gout = zeros(size(t)) ; A=zeros(size(t)) ;
del_init ~ 0.0; % initialize alpha beta filter
for i = 1 : lenth(lg)
    % estimate the bias delta with an alpha beta filter:
    if i==1
        delg(i) = del_init;
    elseif ((lg(i)> g1) && (lg(i) <= g3))
    %else
        delg(i) = alpha*(hg(i) −lg(i)) + beta•delg(i−1);
    else
        del.g(i) = delg(i−1);
    end
%Second Section: blending function:
    g_out(i) = lg( i) ;
    if (abs(lg(i)) > g3) && (abs(lg(i)) <= g4)
        A(i)=(abs(lg(i))−g4)/(g3−g4);
        g_out(i) = A(i)•lg(i) + (1.0−A(i))•(hg(i) − delg(i));
    elseif abs(lg(i)) > g4
        g_out(i) = hg(i);
    end
end
```

The embodiment of FIG. 1 is illustrated with two sensors. It is understood that the teachings of the present invention are not limited to sensor systems with just two sensors. In other embodiments, additional sensors are provided with each of the sensors having an overlapping region of operation with at least one other of the sensors. Thus, in these other embodiments, the sensor system is able to blend the outputs of groups of sensors for overlapping regions of operation. One such example is described below with respect to FIGS. 12 and 13. Additionally, each of first and second sensors 102 and 104 may, in some embodiments, comprise two or more sensors that provide a blended output signal with offset compensation in the manner as described with respect to first and second sensors 102 and 104 of FIG. 1.

Figure 7:
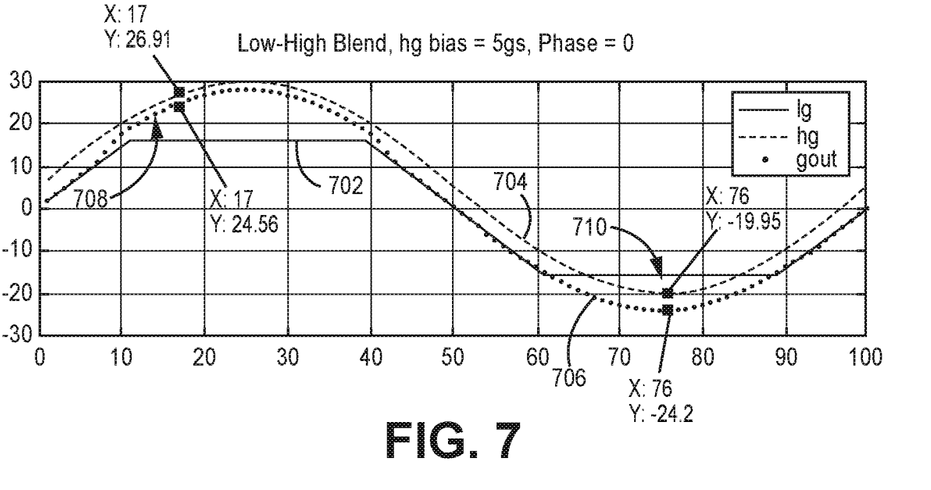
FIGS. 7, 8, and 9 are graphs that illustrate an example of the operation of a system with two sensors that blends the output of the two sensors.
Figure 8:
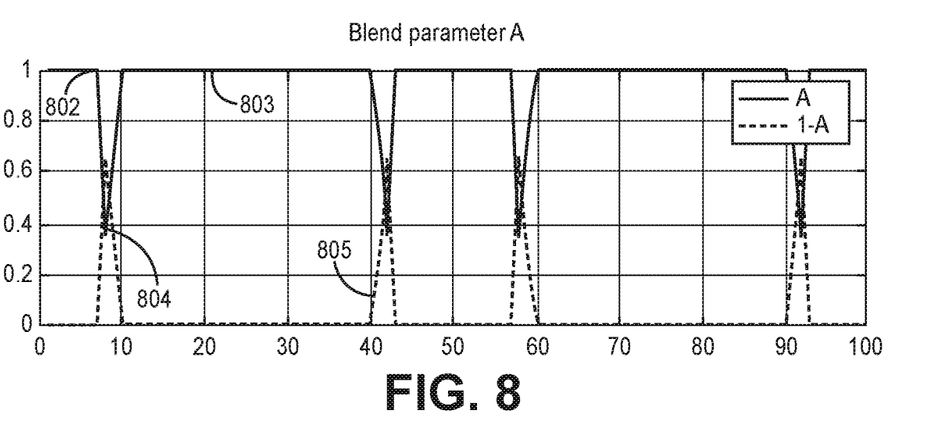
Figure 9:
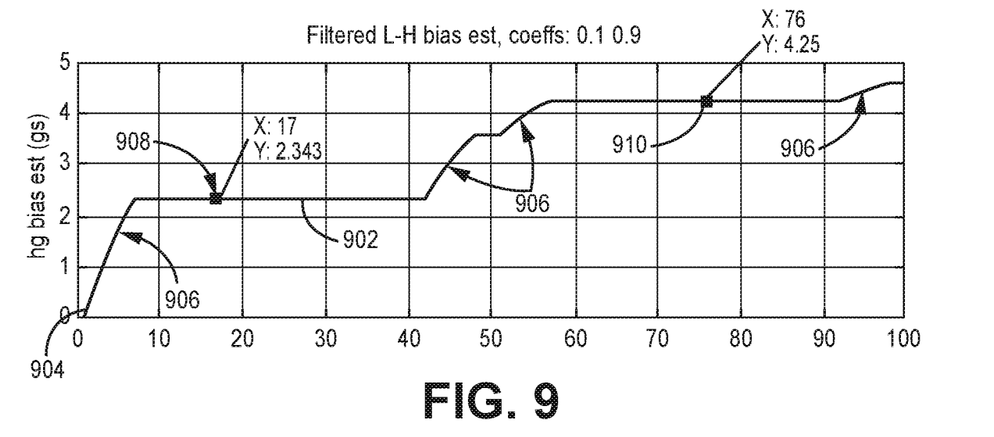

FIGS. 7, 8, and 9 are graphs that illustrate an example of the operation of a system with two sensors in a system that blends the output of the two sensors. These graphs are shown by way of example and not by way of limitation and are provided purely for pedagogical purposes. In these graphs, the input of the sensor system (for example sensor system 100 of FIG. 1) is a sinewave over a period of time represented along the X-axis. The Y-axis is in units of gs. Curves are presented in FIG. 7 that represent examples of the outputs of the first and second sensors 102 and 104 of FIG. 1 as well as the output of the sensor system 100. As shown, the output of the first sensor 102 (curve 702) maxes out around 16 g and otherwise tracks the input signal. Curve 704 represents the output of the second sensor 104. As can be seen, curve 704 is offset from curve 702 for values between +/−16 g. Advantageously, the sensor system 100 estimates this bias (as described above) and removes the offset from the output of the second sensor 104 when that output is used in determining the output of the sensor system 100. Further, as described above with respect to FIGS. 1-6, the sensor system 100 generates an output (curve 706) that is based on the output of the first sensor 102 (curve 702), the adjusted output of the second sensor 104 (the adjusted curve 704), and a blending function.

FIG. 8 illustrates an example of the blending parameter A (curve 803) used in the blending equation described above with respect to FIG. 2 and the code following the description of FIG. 6. When the output of first sensor 102 is above the first threshold (e.g., 11 g), the sensor system 100 enters a blend region (802) and the value of A linearly decreases with increasing input value. When the input reaches the second threshold (804), the value of A returns to a value of one again. The parameter (1-A) applied to the adjusted output of the second sensor 104 is shown in curve 805.

FIG. 9 illustrates the generation of the bias or offset estimation over time in curve 902. The bias estimation starts at zero (904) in this embodiment. In regions where the output of the first sensor 102 is between g1 and g2 (e.g., 4 and 10g), the bias or offset is updated as shown at 906. When the output of the first sensor 102 is not in this region, the value of the bias estimate is maintained at its prior level. This illustrates graphically the process described above with respect to FIGS. 2 and 4 and the code following the description of FIG. 6.

As shown in FIGS. 7 and 9, at point 708, the bias estimate is approximately 2.3 g as seen in curve 902 at 908. This bias value is removed from the output of second sensor 104 (curve 704) to lower the output of the system 100 to the level represented in curve 706 at point 708. At point 710, the bias estimate is 4.25 g as seen on curve 902 at 910. Again, this bias value is removed from the output of the second sensor 104 (curve 704) to lower the output of the system 100 to the level represented in the curve 706 at point 710.

Figure 11:
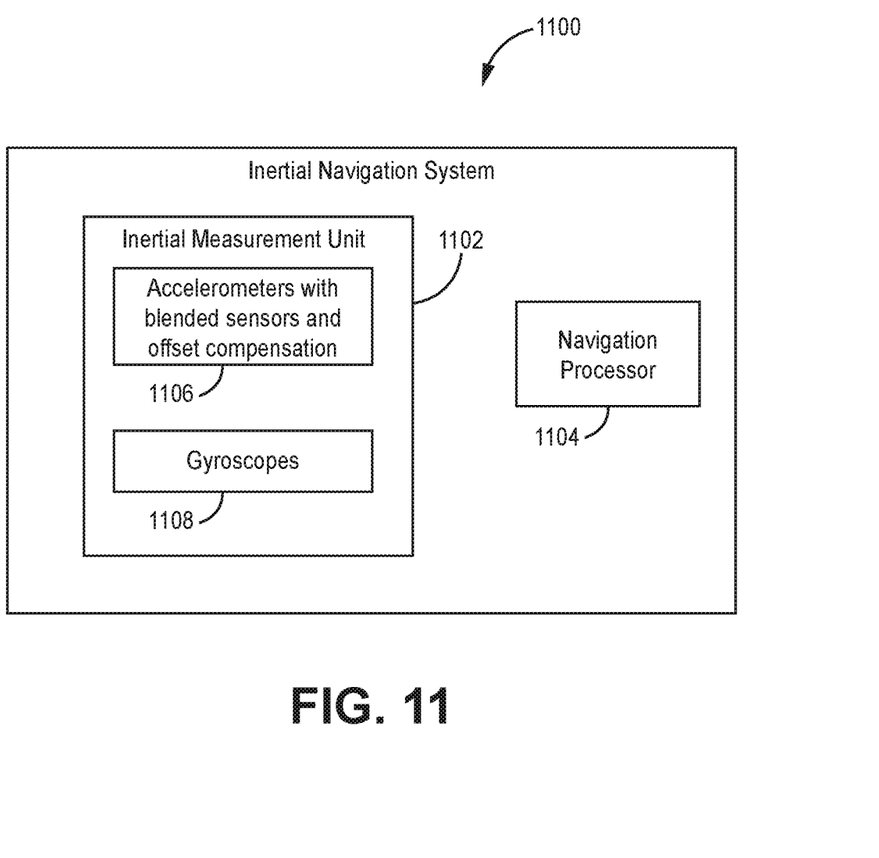
FIG. 11 is a block diagram of an embodiment of an inertial navigation system including an inertial measurement unit with at least one sensor that blends data from two sensors.

FIG. 11 is a block diagram of an inertial navigation system (INS), indicated generally at 1100, including an inertial measurement unit (IMU) 1102 with at least one sensor output that blends data from two sensors. In the embodiment shown, IMU 1102 includes accelerometers 1106 and gyroscopes 1108. Accelerometers 1106 and gyroscopes 1108 generate data for navigation processor 1104. Navigation processor 1104 uses the data from IMU 1102 to provide a navigation solution for an associated body, e.g., vehicle, projectile, rocket, missile, UAV, etc.

Advantageously, in one embodiment, each of accelerometers 1106 is fabricated as described above with respect to FIGS. 1-6 so that the accelerometers provide reliable output over a wide operating range and at low cost. Each accelerometer is implemented using two low-cost MEMS accelerometers. The outputs of the two accelerometers are blended to produce the output of the accelerometer 1106. Further, the output of one of the two accelerometers is adjusted to account for a bias or offset between the two accelerometers.

In other embodiments, gyroscopes 1108 are also implemented according to the teachings of FIGS. 1-6 so that all sensors in IMU 1102 are constructed with two low-cost MEMS sensors that are operated simultaneously and their outputs are combined (with blending and offset compensation) to produce a high performance output over a wide operating range.

Figure 12:
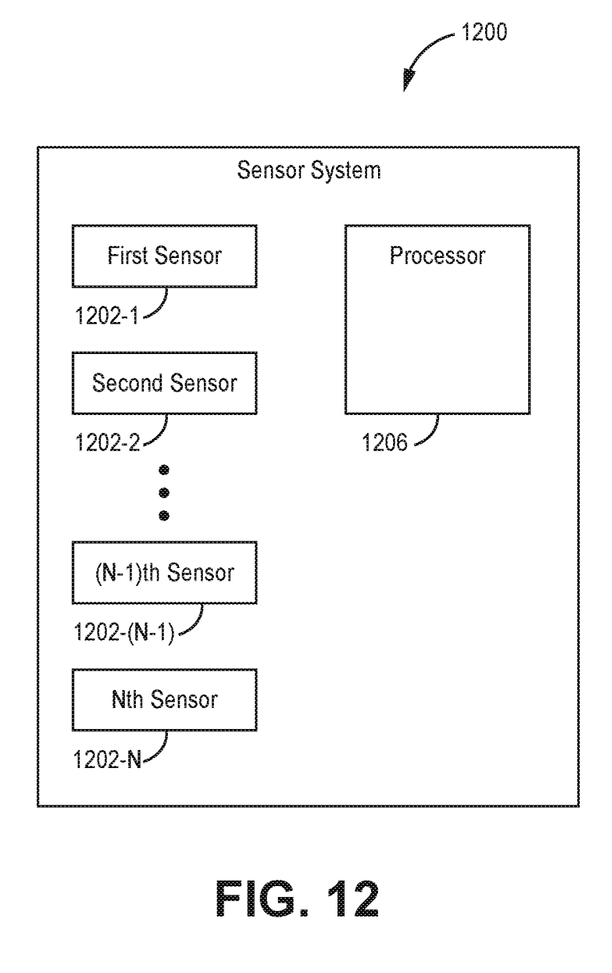
FIG. 12 is a block diagram of another embodiment of a sensor system that blends the outputs of a plurality of sensors while compensating for a sensor bias between the sensors.

FIG. 12 is a block diagram of another embodiment of a sensor system, indicated generally at 1200, that blends the outputs of a plurality of sensors 1202-1 to 1202-N while compensating for a sensor bias of the various sensors. In this embodiment, each of the plurality of sensors 1202-1 to 1202-N has an operating range that overlaps with the operating range of at least one other of the plurality of sensors 1202-1 to 1202-N. The plurality of sensors 1202-1 to 1202-N are run simultaneously and processor 1206 compensates for bias differences in the output of the plurality of sensors 1202-1 to 1202-N. The processor 1206 also blends together these outputs to produce an output for sensor system 1200. Thus, by combining the outputs of the plurality of sensors 1202-1 to 1202-N, sensor system 1200 has a wider, high performance operational range than any of the plurality of sensors 1202-1 to 1202-N taken individually.

For example, in one embodiment, first sensor 1202-1 provides the output of sensor system 1200 at a lowest range and sensor 1202-N provides the output of sensor system 1200 at the highest range of sensor system 1200. The remaining sensors (1202-2 to 1202-(N−1)) provide the output of sensor system 1200 at other ranges between the lowest and highest ranges. Advantageously, the sensor system 1200 has N−1 "crossover ranges" between the ranges that are covered by each of the plurality of sensors 1202-1 to 1202-N. In each of the crossover ranges, the output of the sensor system 1200 is a blended combination of the outputs of the sensors 1202 that provide the output of the sensor system 1200 for the ranges on either side of the cross-over range. This is depicted graphically in FIG. 13.

Figure 13:
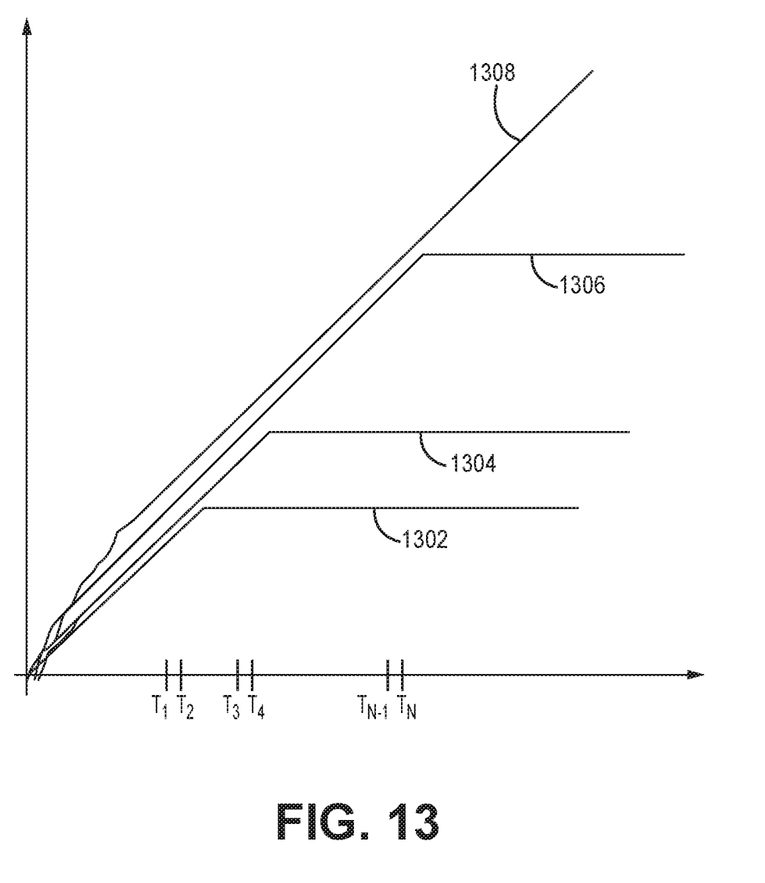
FIG. 13 is a graph that illustrates the operation of the sensor system of FIG. 12 according to one embodiment of the present invention.

As shown in FIG. 13, the output 1302 of first sensor 1202-1 is used as the output of sensor system 1200 up to threshold $T_1$. From threshold $T_1$ to $T_2$, the output of sensors 1202-1 and 1202-2 are blended (and the output of 1202-2 is compensated for any bias). From threshold $T_2$ to $T_3$, the output of sensor 1202-1 (with bias compensation) is used as the output of sensor system 1200. The last cross-over region is between $T_{N-1}$ and $T_N$. In this cross-over region the bias compensated outputs of sensors 1202-(N−1) and 1202-N are blended to provide the output of sensor system 1200. Finally, the top range of output for sensor system 1200 is provided by the bias compensated output of sensor 1202-N.

Example Embodiments

Example 1 includes a method for generating a sensor output from the outputs of first and second sensors, the method comprising receiving the outputs from the first and second sensors; estimating an offset between the outputs of the first and second sensors over a first range of outputs; adjusting the output of the second sensor based on the estimated offset; and generating a sensor output, based on the output of the first sensor, the adjusted output of the second sensor and a blending function that blends the output of the first sensor and the adjusted output of the second sensor.

Example 2 includes the method of example 1, wherein receiving sensor outputs from first and second sensors comprises receiving outputs from first and second accelerometers, gyroscopes, magnetometers, or temperature sensors.

Example 3 includes the method of any of examples 1 and 2, wherein estimating the offset includes passing the outputs of the first and second sensors through an alpha/beta filter.

Example 4 includes the method of example 3, wherein the alpha/beta filter adjusts the estimated offset when the first sensor output falls within the first range.

Example 5 includes the method of example 4, wherein the alpha/beta filter adjusts the offset such that the next offset value (delg(i)) is calculated according to the following equation: delg(i)=alpha*(hg(i)−lg(i))+beta*delg(i−1), wherein alpha and beta are selected constants, hg(i) and lg(i) are the outputs of the first and second sensors, respectively, and delg(i−1) is the immediately prior value of the offset.

Example 6 includes the method of example 5, wherein the alpha/beta filter sets the current value equal to the immediately prior value when the output of the first sensor falls outside the first range.

Example 7 includes the method of any of examples 1 to 6, wherein the sensor output is calculated according to the following equation during a selected range of the output of the first sensor to blend the outputs of the first and second sensors: g_out(i)=A(i)*lg(i)+(1.0−A(i))*(hg(i)−delg(i)), wherein A(i) is calculated according to the equation: A(i)= (abs(1 g(i))−g4)/(g3−g4), wherein lg(i) is the output of the first sensor, hg(i) is the output of the second sensor, delg(i) is the bias or offset value, and g3 and g4 are constants that define the selected range.

Example 8 includes the method of example 7, wherein the output, g_out, is set equal to the output of the first sensor when the output of the first sensor is below a first threshold set by the constant g3, and the output, g_out, is set equal to the output of the second sensor as adjusted for the bias or offset value (delg(i)) when the output of the first sensor is above a second threshold set by the constant g4.

Example 9 includes a sensor system, comprising: a first sensor having a first operational range; a second sensor having a second operational range that overlaps with the operational range of the first sensor, and a processor coupled to the first and second sensors, configured to execute software, wherein the software is operable to cause the sensor system to: receive the outputs from the first and second sensors; estimate an offset between the outputs of the first and second sensors over a first range of outputs; adjust the output of the second sensor based on the estimated offset; and generate a sensor output for the sensor system, based on the output of the first sensor, the adjusted output of the second sensor and a blending function that blends the output of the first sensor and the adjusted output of the second sensor.

Example 10 includes the sensor system of example 9, wherein the first sensor and the second sensor comprise first and second accelerometers, gyroscopes, magnetometers, or temperature sensors.

Example 11 includes the sensor system of any of examples 9 and 10, wherein the processor executes an alpha/beta filter to estimate the offset, wherein the alpha/beta filter adjusts the estimated offset when the first sensor output falls within the first range; and wherein the alpha/beta filter adjusts the offset such that the next offset value (delg(i)) is calculated according to the following equation: delg(i)=alpha*(hg(i)−lg(i))+beta*delg(i−1), wherein alpha and beta are selected constants, hg(i) and lg(i) are the outputs of the first and second sensors, respectively, and delg(i−1) is the immediately prior value of the offset.

Example 12 includes the sensor system of example 11, wherein the alpha/beta filter sets the current value equal to the immediately prior value when the output of the first sensor falls outside the first range.

Example 13 includes the sensor system of any of examples 9 to 12, wherein at least one of the first and second sensors comprises a system of two or more sensors with a blended output signal with offset compensation.

Example 14 includes the sensor system of any of examples 9 to 13, and further comprising at least one additional sensor that provides a crossover range with the second sensor and provides the output of the sensor system above the crossover range.

Example 15 includes the sensor system of any of examples 9 to 14, wherein the processor generates the sensor output according to the following equation during a selected range of the output of the first sensor to blend the outputs of the first and second sensors: g_out(i)=A(i)*lg(i)+(1.0−A(i)) *(hg(i)−delg(i)), wherein A(i) is calculated according to the equation: A(i)=(abs(1 g(i))−g4)/(g3−g4), wherein lg(i) is the output of the first sensor, hg(i) is the output of the second sensor, delg(i) is the bias or offset value, and g3 and g4 are constants that define the selected range.

Example 16 includes the sensor system of example 15, wherein the output, g_out, is set equal to the output of the first sensor when the output of the first sensor is below a first threshold set by the constant g3, and the output, g_out, is set equal to the output of the second sensor as adjusted for the bias or offset value (delg(i)) when the output of the first sensor is above a second threshold set by the constant g4.

Example 17 includes an inertial navigation system, comprising: an inertial measurement unit; a navigation processor coupled to the inertial measurement unit; and wherein the inertial measurement unit includes at least one accelerometer that includes: a first accelerometer having a first operational range; a second accelerometer having a second operational range that overlaps with the operational range of the first accelerometer, and a processor coupled to the first and second accelerometers, configured to execute software, wherein the software is operable to cause the at least one accelerometer to: receive the outputs from the first and second accelerometers; estimate an offset between the outputs of the first and second accelerometers over a first range of outputs using an alpha/beta filter; adjust the output of the second accelerometer based on the estimated offset; and generate a sensor output for the accelerometer, based on the output of the first accelerometer, the adjusted output of the second accelerometer and a blending function that blends the output of the first accelerometer and the adjusted output of the second accelerometer.

Example 18 includes the inertial navigation system of example 17, wherein the alpha/beta filter adjusts the offset such that the next offset value (delg(i)) is calculated according to the following equation: delg(i)=alpha*(hg(i)−lg(i))+beta*delg(i−1), wherein alpha and beta are selected constants, hg(i) and lg(i) are the outputs of the first and second sensors, respectively, and delg(i−1) is the immediately prior value of the offset.

Example 19 includes the inertial navigation system of any of examples 17 and 18, wherein the alpha/beta filter sets the current value equal to the immediately prior value when the output of the first sensor falls outside the first range.

Example 20 includes the inertial navigation system of any of examples 17 to 19, wherein the processor generates the sensor output according to the following equation during a selected range of the output of the first sensor to blend the outputs of the first and second sensors: g_out(i)=A(i)*lg(i)+(1.0−A(i))*(hg(i)−delg(i)), wherein A(i) is calculated according to the equation: A(i)=(abs(1 g(i))−g4)/(g3−g4), wherein lg(i) is the output of the first sensor, hg(i) is the output of the second sensor, delg(i) is the bias or offset value, and g3 and g4 are constants that define the selected range.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for generating a sensor output from the outputs of first and second sensors, the method comprising:
   receiving the outputs from the first and second sensors;
   estimating an offset between the outputs of the first and second sensors over a first range of outputs including passing the outputs of the first and second sensors through an alpha/beta filter, wherein the alpha/beta filter adjusts the estimated offset when the first sensor output falls within the first range;
   adjusting the output of the second sensor based on the estimated offset;
   generating a sensor output, based on the output of the first sensor, the adjusted output of the second sensor and a blending function that blends the output of the first sensor and the adjusted output of the second sensor; and
   wherein the alpha/beta filter adjusts the offset such that the next offset value (delg(i)) is calculated according to the following equation:

$$delg(i)=\text{alpha}*(hg(i)-lg(i))+\text{beta}*delg(i-1)$$

wherein alpha and beta are selected constants, hg(i) and lg(i) are the outputs of the first and second sensors, respectively, and delg(i−1) is the immediately prior value of the offset.

2. The method of claim 1, wherein receiving sensor outputs from first and second sensors comprises receiving outputs from first and second accelerometers, gyroscopes, magnetometers, or temperature sensors.

3. The method of claim 1, wherein the alpha/beta filter sets the current value equal to the immediately prior value when the output of the first sensor falls outside the first range.

4. The method of claim 1, wherein the sensor output is calculated according to the following equation during a selected range of the output of the first sensor to blend the outputs of the first and second sensors:

$$g\_out(i)=A(i)*lg(i)+(1.0-A(i))*(hg(i)-delg(i))$$

wherein A(i) is calculated according to the equation:

$$A(i)=(\text{abs}(lg(i))-g4)/(g3-g4)$$

wherein lg(i) is the output of the first sensor, hg(i) is the output of the second sensor, delg(i) is the bias or offset value, and g3 and g4 are constants that define the selected range.

5. The method of claim 4, wherein the output, g_out, is set equal to the output of the first sensor when the output of the first sensor is below a first threshold set by the constant g3, and the output, g_out, is set equal to the output of the second sensor as adjusted for the bias or offset value (delg(i)) when the output of the first sensor is above a second threshold set by the constant g4.

6. A sensor system, comprising:
   a first sensor having a first operational range;
   a second sensor having a second operational range that overlaps with the operational range of the first sensor, and
   a processor coupled to the first and second sensors, configured to execute software, wherein the software is operable to cause the sensor system to:
   receive the outputs from the first and second sensors;
   estimate an offset between the outputs of the first and second sensors over a first range of outputs;
   adjust the output of the second sensor based on the estimated offset;
   generate a sensor output for the sensor system, based on the output of the first sensor, the adjusted output of the second sensor and a blending function that blends the output of the first sensor and the adjusted output of the second sensor; and
   at least one additional sensor that provides a crossover range with the second sensor and provides the output of the sensor system above the crossover range.

7. The sensor system of claim 6, wherein the first sensor and the second sensor comprise first and second accelerometers, gyroscopes, magnetometers, or temperature sensors.

8. The sensor system of claim 6, wherein the processor executes an alpha/beta filter to estimate the offset, wherein the alpha/beta filter adjusts the estimated offset when the first sensor output falls within the first range; and wherein the alpha/beta filter adjusts the offset such that the next offset value (delg(i)) is calculated according to the following equation:

$$delg(i)=\text{alpha}*(hg(i)-lg(i))+\text{beta}*delg(i-1)$$

wherein alpha and beta are selected constants, hg(i) and lg(i) are the outputs of the first and second sensors, respectively, and delg(i−1) is the immediately prior value of the offset.

9. The sensor system of claim 8, wherein the alpha/beta filter sets the current value equal to the immediately prior value when the output of the first sensor falls outside the first range.

10. The sensor system of claim 6, wherein at least one of the first and second sensors comprises a system of two or more sensors with a blended output signal with offset compensation.

11. The sensor system of claim 6, wherein the processor generates the sensor output according to the following equation during a selected range of the output of the first sensor to blend the outputs of the first and second sensors:

$$g\_out(i)=A(i)*lg(i)+(1.0-A(i))*(hg(i)-delg(i))$$

wherein A(i) is calculated according to the equation:

$$A(i)=(\text{abs}(lg(i))-g4)/(g3-g4)$$

wherein lg(i) is the output of the first sensor, hg(i) is the output of the second sensor, delg(i) is the bias or offset value, and g3 and g4 are constants that define the selected range.

12. The sensor system of claim 11, wherein the output, g_out, is set equal to the output of the first sensor when the output of the first sensor is below a first threshold set by the constant g3, and the output, g_out, is set equal to the output of the second sensor as adjusted for the bias or offset value (delg(i)) when the output of the first sensor is above a second threshold set by the constant g4.

13. An inertial navigation system, comprising:
an inertial measurement unit;
a navigation processor coupled to the inertial measurement unit; and
wherein the inertial measurement unit includes at least one accelerometer that includes:
a first accelerometer having a first operational range;
a second accelerometer having a second operational range that overlaps with the operational range of the first accelerometer, and
a processor coupled to the first and second accelerometers, configured to execute software, wherein the software is operable to cause the at least one accelerometer to:
receive the outputs from the first and second accelerometers;
estimate an offset between the outputs of the first and second accelerometers over a first range of outputs using an alpha/beta filter;
adjust the output of the second accelerometer based on the estimated offset;
generate a sensor output for the accelerometer, based on the output of the first accelerometer, the adjusted output of the second accelerometer and a blending function that blends the output of the first accelerometer and the adjusted output of the second accelerometer; and
wherein the alpha/beta filter sets the current value equal to the immediately prior value when the output of the first sensor falls outside the first range.

14. The inertial navigation system of claim 13, wherein the alpha/beta filter adjusts the offset such that the next offset value (delg(i)) is calculated according to the following equation:

$$delg(i)=\text{alpha}*(hg(i)-lg(i))+\text{beta}*delg(i-1)$$

wherein alpha and beta are selected constants, hg(i) and lg(i) are the outputs of the first and second sensors, respectively, and delg(i−1) is the immediately prior value of the offset.

15. The inertial navigation system of claim 13, wherein the processor generates the sensor output according to the following equation during a selected range of the output of the first sensor to blend the outputs of the first and second sensors:

$$g\_out(i)=A(i)*lg(i)+(1.0-A(i))*(hg(i)-delg(i))$$

wherein A(i) is calculated according to the equation:

$$A(i)=(\text{abs}(lg(i))-g4)/(g3-g4)$$

wherein lg(i) is the output of the first sensor, hg(i) is the output of the second sensor, delg(i) is the bias or offset value, and g3 and g4 are constants that define the selected range.

* * * * *